US008612393B2

(12) United States Patent
Huang et al.

(10) Patent No.: US 8,612,393 B2
(45) Date of Patent: Dec. 17, 2013

(54) APPLICATION SERVER PROVISIONING SYSTEM AND METHOD BASED ON DISK IMAGE PROFILE

(75) Inventors: Jian Huang, Beijing (CN); Wei Li, Beijing (CN); Pei Ni Liu, Beijing (CN); Hao Wang, Beijing (CN); Zhe Xiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 12/052,783

(22) Filed: Mar. 21, 2008

(65) Prior Publication Data

US 2008/0235266 A1 Sep. 25, 2008

(30) Foreign Application Priority Data

Mar. 23, 2007 (CN) .......................... 2007 1 0091833

(51) Int. Cl.
*G06F 7/00* (2006.01)

(52) U.S. Cl.
USPC ........... 707/655; 707/641; 707/644; 707/654; 707/661

(58) Field of Classification Search
None
See application file for complete search history.

(56) References Cited

U.S. PATENT DOCUMENTS

| 5,276,860 | A | * | 1/1994 | Fortier et al. ................... 714/6.3 |
| 5,673,382 | A | * | 9/1997 | Cannon et al. ............... 714/6.31 |
| 7,403,960 | B2 | * | 7/2008 | Kodama ........................ 707/639 |
| 7,743,028 | B1 | * | 6/2010 | Stringham et al. ............ 707/646 |
| 2002/0049718 | A1 | * | 4/2002 | Kleiman et al. ................... 707/1 |
| 2003/0159007 | A1 | * | 8/2003 | Sawdon et al. ................ 711/154 |
| 2003/0182325 | A1 | * | 9/2003 | Manley et al. ................. 707/204 |
| 2003/0191911 | A1 | * | 10/2003 | Kleinschnitz et al. ........ 711/154 |
| 2004/0054780 | A1 | | 3/2004 | Romero |
| 2004/0268068 | A1 | * | 12/2004 | Curran et al. .................. 711/162 |
| 2005/0086241 | A1 | * | 4/2005 | Ram et al. ...................... 707/100 |
| 2006/0123414 | A1 | | 6/2006 | Fors et al. |
| 2007/0162690 | A1 | * | 7/2007 | Xing et al. ..................... 711/111 |
| 2008/0144471 | A1 | * | 6/2008 | Garapati et al. ................ 369/99 |

OTHER PUBLICATIONS

Brown, "Servers Simplified", Network Computing, Nov. 18, 2004.
Tsuneya, "New Management Technologies for Blade Servers", Fujitsu Sh. Tech. J., vol. 40-Issue 1, pp. 141-150, Jun. 2004.
Martin, "Automated Generic Operating System Installation and Maintenance", USENIX Proceedings of 3rd Conf. on LISA of Windows NT, vol. 3, pp. 61-70 (Aug. 1, 2000).
"N1 Grid Service Provisioning System Solution for Application Management", sun.com/software, pp. 1-20, Mar. 2004.
"N1 Grid Service Provisioning System, Managing Complexity: The Need for Intelligent Automation in Application Deployments", sun.com/software, pp. 1-20, Dec. 2004.

* cited by examiner

*Primary Examiner* — Mohammad S Rostami
(74) *Attorney, Agent, or Firm* — William Stock; Anne Vachon Dougherty

(57) ABSTRACT

An application server disk image generating apparatus and method comprising a basic disk image generating component for generating basic disk images for basic programs used by the server; an incremental disk image generating component for generating incremental disk images including heritage relationship for other respective applications based on the basic programs used by the server; and an image profile generating means for generating an image profile for each of the basic disk images and the incremental disk images. By using the apparatus, the storage consumption can be decreased greatly and the storage efficiency can be improved. The invention also discloses an application server disk image management and distribution system to which the application server disk image generating apparatus is applied, and a system for provisioning the application server using disk images.

16 Claims, 6 Drawing Sheets

APPLICATION SERVER PROVISIONING SYSTEM AND METHOD BASED ON DISK IMAGE PROFILE

FIELD OF THE INVENTION

The present invention generally relates to an application server provisioning system and method, and particularly, to a system and method for managing and distributing application server disk images and image profiles, and provisioning an application server using the disk images based on the image profiles.

DESCRIPTION OF THE RELATED ART

In recent years, the demands that customers require service-oriented IT business to provide application server provisioning have increased dramatically. The so-called application server provisioning refers to an operation of installing and configuring various software on an application server. A conventional application server provisioning method is that an engineer brings all software installation CDs to customer's sites, and installs and configures an operating system and various application software components on the application server one by one as customers required. The problem of this conventional provisioning method lies in that the engineer providing the application server provisioning service must take a long time and effort to do this work, which is very painful for the engineer who does this laborious work day after day. Furthermore, the conventional provisioning method is complicated and time-consuming, thereby increasing the probability of the occurrence of human errors. Additionally, since the applications have to be updated to their new versions continuously, the engineer always needs to know how to make the installed applications work well together without the occurrence of collision, performance decrease or the like. Moreover, since there lacks a fast and simple provisioning method to fit a customer's dynamic architecture design, the provisioning experience of unique installation and configuration that the customer or the engineer performs on an application sever can not be reused for other application servers that have completely the same installation and configuration requirements.

A well-known used method for solving this problem is to apply a prepared disk image to the application server and provision the application server by restoring a disk. IBM RDM (Remote Deployment Manager) is one of such provisioning tools. GHOST is another well-known disk image creating and restoring tool.

However, customers' requirements are dynamic, and different customers require different application servers with different pre-installed applications. In order to satisfy the dynamic customers, a provisioning service provider has to prepare and maintain a large number of disk images for the provisioning of various application servers, and thus storing those disk images will consume a huge amount of storage. For example, taking a simple data center scenario as an example, suppose that there are 4 different server machine types (IBM BladeServer HS20, X460, X100 and BladeCenter H Chassis), 3 different types of operating systems (Windows XP, Windows 2000 and Linux), a database application with 2 versions (DB2 v8.0 and DB2 v7), and WebSphere applications with two versions (WAS 6 and WAS 5), and both DB2 and WAS may be installed on a same server, or only one of them may be installed. Therefore, to satisfy different customer requirements, there should be 4×3×(2+2+2×2)=96 different application server installation options. As is known to all, the typical server disk size is usually very large, and the size of the disk image is at least the same as the size of data actually saved on the disk, i.e. the size of the disk with empty parts removed. Therefore, the disk image for the typical server disk is also usually very large, for example, 20G. Thus, if one disk image is created for each of the 96 different installation options, these disk images need to consume a storage space of up to 96×20=1920G=1.92T in total. Note, this is just a very simple example, and the real scenarios are often much more complicated, thereby resulting in an unimaginable storage capacity requirement and making that disk image-based application server provisioning is impossible to apply.

Another major problem is to distribute and manage such a huge number of disk images worldwide. Current international IT companies have to provide provisioning service at different sites. But to get all disk images stored locally to the customer and keep the updating of the disk images requires much management effort.

SUMMARY OF THE INVENTION

The invention proposes a system and method for managing and distributing application server disk images and image profiles, and provisioning an application server using the disk images based on the image profiles. With the system and method, a large number of disk images may be stored in a typical enterprise storage system; the disk images may be distributed worldwide; and fast and easy provisioning processes may be performed on these disk images.

According to an aspect of the invention, there is provided an application server disk image generating apparatus and method. The application server disk image generating apparatus comprises a basic disk image generating means for generating basic disk images for basic programs used by the server; an incremental disk image generating means for generating incremental disk images including heritage relationships for other respective applications based on the basic programs used by the server; and an image profile generating means for generating an image profile for each of the basic disk images and the incremental disk images, the image profile being used to describe requirements of hardware, software and configuration of provisioning the disk images, and describe the heritage relationship between the disk image and other disk images.

In the above disk image generating apparatus, an incremental disk image generating manner is adopted, i.e. only an incremental part of the disk image to be generated relative to the existing disk image is stored as an incremental disk image; while as for other same parts as the existing disk image, they are shared with the existing disk image and only a heritage relationship map is saved. Since there are a lot of common data blocks among child images, parent images and ancestor images, those data blocks will share the same storage blocks, thereby greatly decreasing storage consumption and improving storage efficiency. Therefore, for a commercial storage system, we could create and store a large number of application server disk images to construct a fast and on-demand application server provisioning service repository.

According to another aspect of the invention, there is provided an application server disk image managing and distributing system comprising a basic disk image generating means for generating basic disk images for basic programs used by the server; an incremental disk image generating means for generating incremental disk images including heritage relationship for other respective applications based on the basic programs used by the server; an image profile generating means for generating an image profile for each of the basic disk images and the incremental disk images; an image repository for storing the generated disk images and image profiles; and a distribution server for distributing disk images and a corresponding image profiles from the image repository to the client based on the receipt of a request to add or update the disk image from a client that already has said basic disk images, or actively according to pre-settings of a customer.

According to yet another aspect of the invention, there is provided a system for provisioning an application server using disk images comprising a basic disk image manager for storing basic disk images for basic programs and corresponding image profiles in a client image repository; an incremental disk image manager for receiving and processing a request to add or update a disk image from a customer; the client image repository for storing the disk images and the image profiles; a distribution agent for, under the control of the incremental disk image manager transferring the request to add or update the disk image from the customer to a disk image management and distribution system and receiving the requested disk images and image profiles provided by the disk image management and distribution system, as well as receiving the disk images and the image profiles actively sent by the disk image management and distribution system according to pre-settings of a customer; and a provisioning means for restoring the disk image to the application server of the customer for provisioning.

For an application server provisioning service provider, adopting the above disk image management and distribution system and provisioning system greatly reduces the time of deployment, simplifies the deployment process, reduces the time of engineer training and thereby decreases the cost; avoids human errors and provides a globally most advanced service version; and makes experience, skills and operations in the provisioning process become reusable assets and reduces the delay of transmitting solutions. For a customer requiring the provisioning service, he can share expert experience worldwide, because the contents of the basic disk images are determined by experts in the art and delivered to the customer's site via an optical disk and a network. Once the customer obtains the basic disk images, he can build up his own disk image repository for further on-demand provisioning. Alternatively, the customer may just restore it to the application server which makes the application server available in a few minutes. And, if the customer wants an updated application, he may obtain an incremental image with a small size from the Internet. Therefore, this method can meet customers' provisioning requirements flexibly.

According to yet another aspect of the invention, there is provided an application server disk image generating method comprising generating basic disk images for basic programs used by the server; generating incremental disk images including heritage relationships for other respective applications based on the basic programs used by the server; and generating an image profile for each disk image of the basic disk images and the incremental disk images.

According to yet another aspect of the invention, there is provided a method of acquiring a disk image from a disk image management and distribution center for provisioning an application server, comprising: generating basic disk images for basic programs used by the application server, generating incremental disk images relative to existing disk images for other programs based on the basic programs, and generating an image profile for each of the disk images for describing heritage relationships between the disk image and other disk images, in the disk image management and distribution center, the image profile being also used to describe requirements of hardware, software and configuration of provisioning the disk image; storing the generated disk images and image profiles in an image repository; acquiring the basic disk images from the disk image management and distribution center and storing them in a client image repository by a client provisioning service center; receiving parameters required for provisioning the application server input by a customer and calling a distribution agent to send a provisioning request to a distribution server of the disk image management and distribution center by a client image manager; querying an image profile matching the received parameters in the image repository and distributing the matching image profile and a corresponding incremental disk image to the client by a distribution server; receiving the incremental disk image and the image profile and storing them in the client image repository by the distribution agent of the client; and performing the provisioning by restoring the corresponding disk image to the application server of the client by the client image manager according to provisioning requirements of the customer.

BRIEF DESCRIPTION OF THE DRAWINGS

These and/or other aspects, features and advantages of the invention will become apparent and more readily understood from the following description of embodiments in conjunction with the attached drawings, in which.

DETAILED DESCRIPTION OF THE INVENTION

Figure 1:
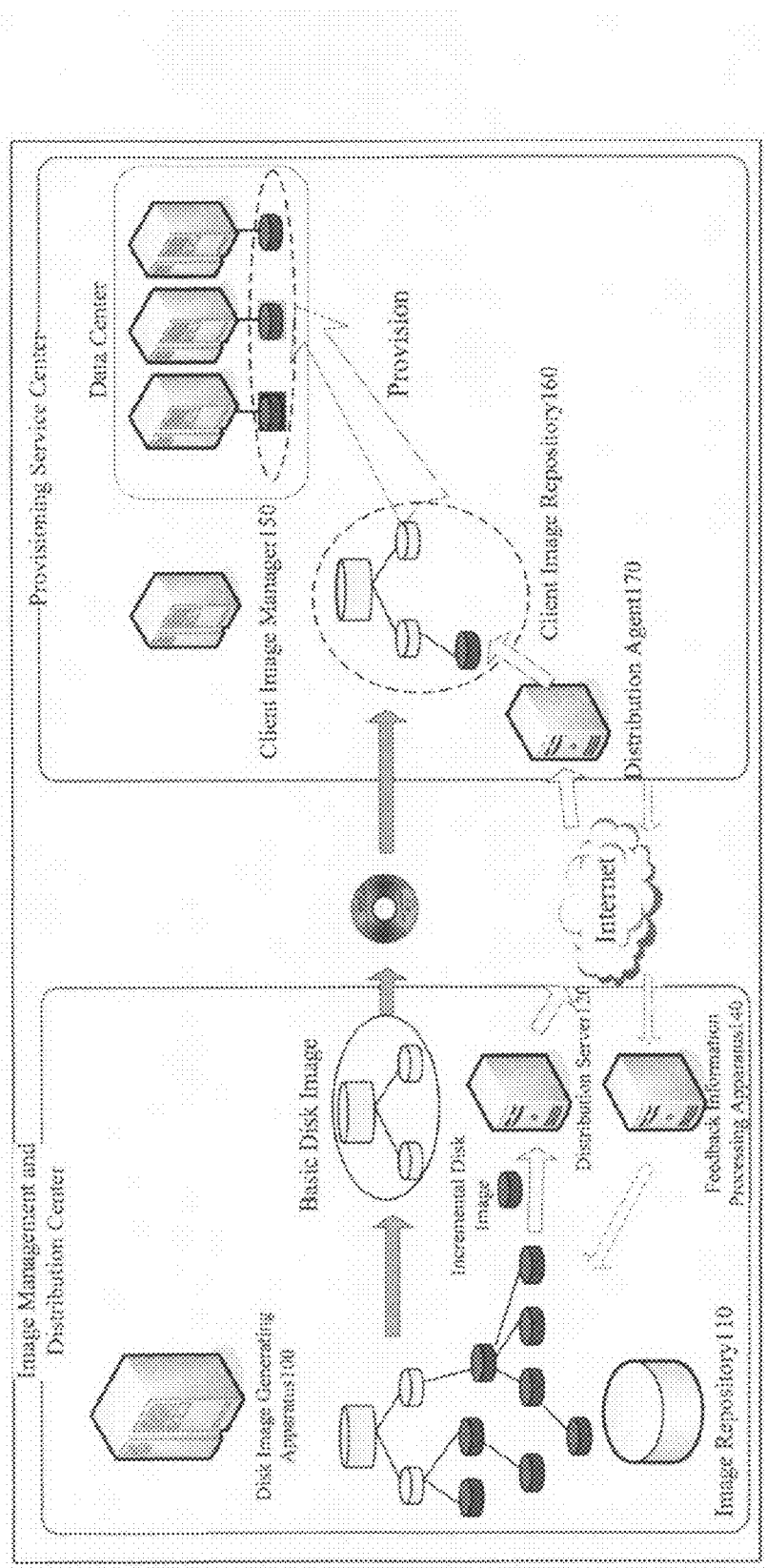
FIG. 1 depicts a system providing application server image provisioning service according to an embodiment of the invention.

Now, a detailed description of exemplary embodiments of the invention will be given with reference to the attached drawings, wherein like reference numerals refer to the same elements throughout. Hereinafter, the exemplary embodiments are described with reference to the attached drawing to explain the invention.

FIG. 1 depicts a system providing application server disk images and performing provisioning service according to an embodiment of the invention. As shown in FIG. 1, this system comprises an image management and distribution center on server end and a provisioning service center on client end.

The image management and distribution center on the server end may be a worldwide data center, which generates and maintains disk images provided for various software so that disk images meeting requirements can be provided on receipt of requests from customers all over the world.

Referring to FIG. 1, the image management and distribution center comprises a disk image generating apparatus 100, an image repository 110, and a distribution server 120. In addition, the image management and distribution center may further comprise a feedback information processing apparatus 140 if necessary.

Figure 2:
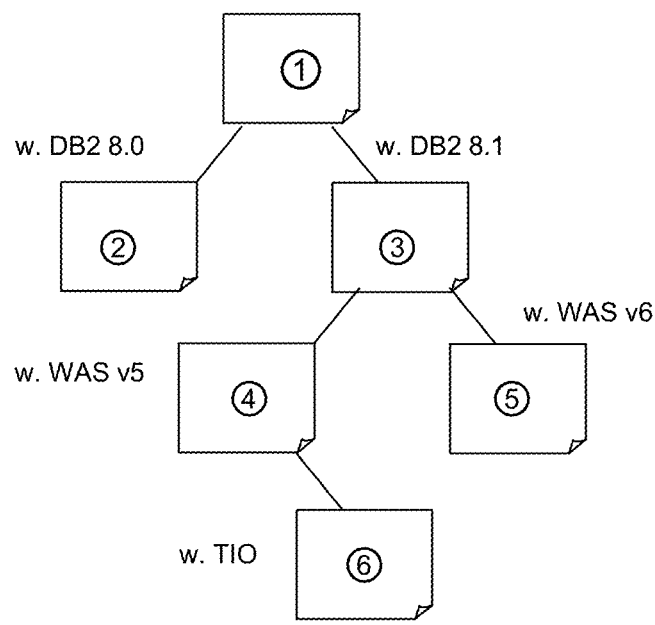
FIG. 2 is an example representing heritage relationship among respective disk images according to the embodiment of the invention.

The disk image generating apparatus 100 is used to generate disk images and image profiles corresponding to an operating system and various applications installed in the application server. Since the image management and distribution center may be a worldwide data center, various possible application server configurations should be considered and corresponding disk images should be generated, so that the customers all over the world can obtain desired disk images from the data center. It is easily recognized that there are natural heritage relationships among the respective disk images. Taking FIG. 2 as an example, firstly, a disk image 1 of Windows2000 on an IBM Blade Server is generated. The disk image 1 can be used to provision a Windows2000 server. Then, based on the Windows2000 server, DB2 v8.1 may be installed, and a DB2 v8.1 disk image 3 is made to provision DB2 server disk image. Thirdly, based on the DB2 server, a WebSphere application v5 may be installed, and a WebSphere disk image 4 is made. Finally, a Tivoli Intelligent Orchestration will be installed and a TIO disk image 6 will be made. It can be seen that the disk images 1, 3, 4 and 6 have natural heritage relationships.

The disk image generating apparatus 100 will build up a disk image in an incremental way according to the heritage relationships of the respective disk images. Firstly, basic disk images are generated and stored in the image repository 110; when other disk images have heritage relationships are generated, the disk image to be generated is compared with the disk images already stored in the image repository 110, only the different part relative to the existing disk image is stored as an incremental disk image, the other same parts are shared with the existing disk image instead of being stored repeatedly, and an image profile indicating this heritage relationship is generated. There may be one or more basic disk images. By default, common server operating systems are treated as the contents of the basic disk images, and engineers may modify these basic disk images according to their professional knowledge and experience, and choose a combination of the applications which are most commonly used and most likely to meet the configuration provisioning requirements of the most application servers and have limited sizes. Since the basic disk images will not change in a long time, have universality and have limited sizes, they are saved on optical disks, such as CDs/DVDs and the like in the invention. Thus, the engineers only need to bring a limited number of optical disks to the customers to readily fulfill the basic provisioning requirements of most users. Alternatively, if the customers have brought optical disks for the above disk images in advance, the customers can restore the contents in the optical disks to application servers themselves to complete the basic provisioning.

Additionally, the disk image generating apparatus 100 also provides for each disk image an image profile which describes inherent attribute information of the disk image using XML (Extensible Markup Language) or other data description language, such as SGML and HTML, or a set of self-defined data description language. The image profile may describe heritage relationships between its corresponding disk image and other disk images. Moreover, the image profile describes the requirements of provisioning the disk images, including the requirements of hardware, software and configuration of the application server. According to the heritage relationships described in the image profile, the disk image generating apparatus 100 may generate a tree topology of the disk images. In addition, after generating and storing the image profiles, the image management and distribution system supports the customer to query an image profile through SQL language or other specific query languages and quickly get a disk image linked to the profile (the corresponding disk image may be obtained quickly by establishing a one-to-one corresponding relationship between the image profiles and the disk images by means of setting pointers and the like), and distributes it to the customer via the distribution server or in another way that the customer desires (this query and distribution process will be described in detail hereinafter).

The disk images and image profiles generated by the disk image generating apparatus 100 may be stored in the image repository 110 in various well-known ways, such as by a tree structure, sequential storage and content addressed storage (CAS). In this specification, the tree structure storage will be taken as an example for illustration.

An exemplary structure of the disk image generating apparatus 100 is composed of a basic disk image generating means, an incremental disk image generating means and an image profile generating means.

The basic disk image generating means is used to generate basic disk images for basic programs (e.g. the operating system, basic applications, and so on) used by an application server in the client end, and the generated basic disk images are suitable for the provisioning requirements of application servers of most customers.

The incremental disk image generating means is used to generate disk images for other respective applications that have natural heritage relationships with the basic programs used by the server. The incremental disk image generating means only saves the different part of the disk image to be generated relative to the existing disk image as an incremental disk image, with other same parts being shared with the existing disk image instead of being stored repeatedly, and generates an image profile used to indicate this heritage relationship.

The image profile generating means provides for each of the basic disk images and the incremental disk images an image profile describing inherent attribute information of the disk image using XML or other data description language, such as SGML and HTML, or a set of self-defined data description language. The image profile describes the heritage relationship between its corresponding disk image and other disk images. The image profile also describes the requirements of provisioning disk images, including the requirements of hardware, software and configuration of the application server.

It is readily contemplated that the disk image generating apparatus 100 may adopt various other structures. For example, in the above example, the basic disk image and the incremental disk images are generated by two means separated from each other, however, alternatively, the basic disk image and the incremental disk images may be generated by one same means.

Figure 3:
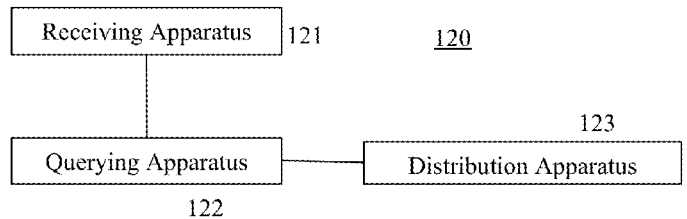
FIG. 3 shows a block diagram of the structure of a distribution server in FIG. 1 according to the embodiment of the invention.

The distribution server 120 receives a request to add or update a disk image from the client provisioning service center, and sends the requested disk image to the client via a network (the requested disk image can be stored on an optical disk or a removable hard disk so as to be provided to the client). The distribution server 120 will be described in detail below with reference to FIG. 3. As shown in FIG. 3, the distribution server 120 is composed of a receiving apparatus 121, a querying apparatus 122 and a distribution apparatus 123. The receiving apparatus 121 receives the request to add or update the disk image from the client. The request describes the hardware, software and configuration requirements of the provisioning of the application server using XML or other data description languages, such as SGML and HTML, or a set of self-defined data description language. The querying apparatus 122 takes the received provisioning requirements as a query condition, and queries an image profile matching the input provisioning requirements in the image repository by a well-known query language, such as the SQL language or the like. If an image profile completely matching the query condition is found, the image profile and its corresponding disk image are delivered to the distribution apparatus 123. If there is no completely matching image profile but only a near matching profile is found, the customer may decide whether to use this near matching profile and make some modifications after provisioning, or request the image management and distribution center to newly generate a completely matching disk image and image profile and then provide them to the client. In the former, the querying apparatus 122 delivers directly the found near matching image profile and a corresponding disk image to the distribution apparatus 123. In the latter, the disk image generating apparatus 100 creates a new image profile and a new image according to the existing image profiles and disk images. The new profile and image are delivered to the distribution apparatus 123 and are stored in the image repository at the same time. The distribution apparatus 123 sends the disk image and profile delivered thereto to the client via the Internet. Alternatively, instead of being sent via a network, the disk image and image profile obtained by querying may be copied to a storage medium, such as an optical disk, and provided to the client.

For a completely matching disk image, it only needs to be restored to the application server of the customer, and the engineer or the customer does not need to make any manual modification and adjustment to the server any more. Likewise, for a near matching image, the higher the near matching degree is, the less the manual modifications and adjustments that the engineer or customer needs to make after provisioning the server using the disk image, and vice versa. When the near matching degree is too low, the found disk image tends to not be used to provision the application server at this time, because the engineer needs to make many manual modifications to the server after using the found disk image to provision the server and, instead, the engineer provisions the application server in a conventional way according to the customer's requirements.

After the engineer makes a modification to the application server or provisions the application server in a conventional way, it may be desirable to regard this provisioning or change as the experience of the customer's site and feed it back to the image management and distribution center, so as to add a new image and image profile thereto. This function may be achieved by a feedback information processing apparatus 140 of the distribution center. When receiving a modification of the provisioning of the server fed back from the client in the feedback information processing apparatus 140, the disk image generating apparatus 100 generates new image profile and disk image corresponding to the modification and stores them in the image repository 110, thereby enabling them to be used in future provisioning.

Figure 4:
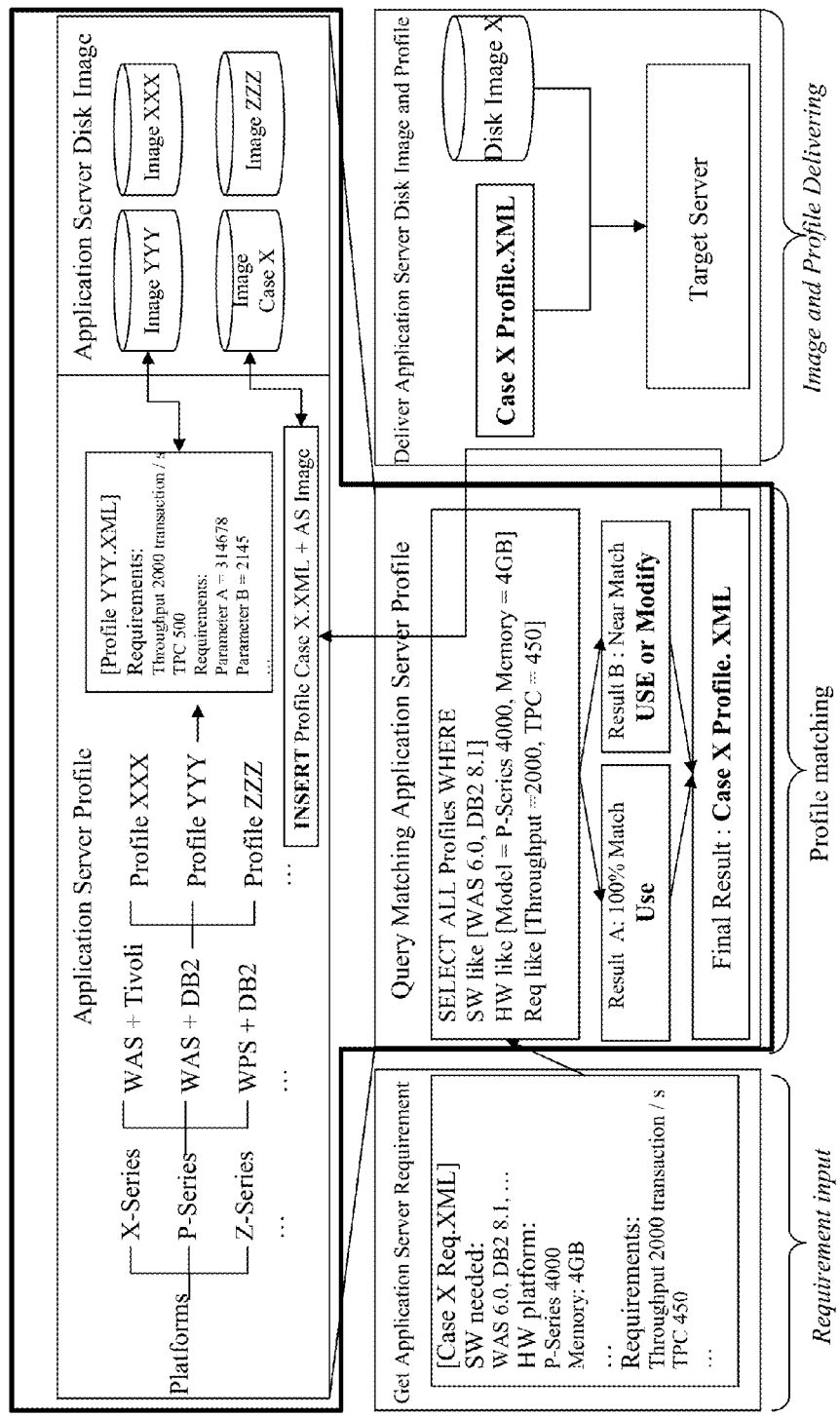
FIG. 4 shows an example in which the distribution server in FIG. 1 queries a disk image repository in response to a request of a client and sends a requested disk image to the client according to the embodiment of the invention.

FIG. 4 gives an example in which the above distribution server 120 queries the disk image repository in response to the request of the client and sends the requested disk image to the client. As shown in FIG. 4, for example, disk images XXX, YYY, and ZZZ are stored in the image repository 110 of the image management and distribution center, wherein the disk image XXX is used for configuring a Tivoli application server based on WebSphere on an X-Series platform, the disk image YYY is used for configuring a DB2 application server based on WebSphere on a P-Series platform, and the disk image ZZZ is used for configuring a DB2 application server based on WebSphere on a Z-Series platform. Additionally, the image repository 110 also stores image profiles XXX, YYY and ZZZ corresponding to the above disk images respectively, which describe inherent attribute information of the corresponding disk image, such as the requirements of provisioning disk images (including the requirements of hardware, software and configuration of the application servers), and the heritage relationship between the respective disk images and other disk images, etc. using XML language. As is shown by "Get Application Server Requirement" in FIG. 4, assume that the hardware requirement of the provisioning of the application server input by the customer is P-Series 4000 with a storage of 4 GB, the software requirement is DB2 v8.1 based on WebSphere 6.0, and the configuration requirement is the throughput of 2000 transaction/second and the ¥/TPC of 450. After receiving the request of the customer, the querying apparatus 122 of the distribution server 120 queries disk image profiles matching the request of the customer in the image repository 110 by the SQL language. If an image profile completely matching the request of the customer as the querying condition, the image profile and a corresponding disk image are delivered to the distribution apparatus 123. If there is no completely matching image and instead a near matching profile is found (for example, only a near matching image profile YYY is found in the example shown in FIG. 4), any of the following processes is performed according to the customer's requirement: (1) the found near matching image profile YYY and the corresponding disk image YYY are delivered to the distribution apparatus 123; and (2) a new completely matching image profile X and a new image X are created and delivered to the distribution apparatus 123, and at the same time the newly created image profile X and disk image X are stored in the image repository for the future provisioning. The distribution apparatus 123 sends the disk image and image profile delivered thereto to the client.

Hereinbefore, description is given to that the distribution server 120 sends the requested disk image to the client in response to the request from the client. However, the distribution server is not limited to only receive the request passively to send the disk image, but may also send updates of the disk image and the image profile actively to the client according to pre-settings of the user. For example, the distribution server may send the update once every a preset time interval, or send the update once each time when the newly added disk images in the image repository 110 reach a predetermined number, or the like.

The provisioning service center of the client is local to the customer, which provisions the application server of the customer by restoring the disk image obtained from the image management and distribution center to the server.

As is shown in FIG. 1, the provisioning service center comprises a client image manager 150, a client image repository 160 and a distribution agent 170.

The client image manager 150 provides managing functions for the client image repository 160 and the distribution agent 170. When the customer obtains the basic images provided by the image management and distribution center, the client image manager 150 may copy these basic images to the client image repository 160 and store them therein. The basic disk images are stored in the client image repository 160 in a tree structure (they may also be stored in other ways, such as sequential storage or compressed storage), and form an image relationship tree as a part of the original tree in the image repository 110 of image management and distribution center. If the disk image in the client image repository 160 is being updated or the customer wants more disk images, the client image manager 150 calls the distribution agent 170 to send the request and manages the downloaded incremental images to expand the image relationship tree. The request describes the requirements of hardware, software and configuration of the provisioning of the application server using XML or other data description languages, such as SGML, HTML, or a set of self-defined data description language. The distribution agent 170 receives the requested incremental disk image and image profile and stores them in client image repository. After obtaining the desired incremental disk image, the client image manager 150 combines the received incremental disk image and other stored disk images into an integrated disk image according to the provisioning requirements of the customer, and performs the provisioning by restoring (copying) this integrated disk image to the application server. Additionally, the client image manager 150 also expands the tree topology in the client image repository according to the received incremental image.

Optionally, before calling the distribution agent 170 to send the request, the client image manager 150 may search the client image repository to determine whether there are a matching image profile and a disk image (this querying operation is similar to the querying operation performed by the distribution server 120 of the management and distribution center, details omitted), and restore the searched disk image directly to the application server for provisioning.

In an exemplary embodiment, the client image manager 150 may having a basic disk image manager for storing the basic images provided by the image management and distribution center into the client image repository 160, an incremental disk image manager for receiving and managing a request to add or update a disk image from a customer, calling the distribution agent 170 to send the request to the image management and distribution center, and expanding the tree topology in the client image repository according to the received incremental image, and a provisioning means for restoring the disk image to the application server of the customer for provisioning under the control of the incremental disk image manager. The above is only an exemplary structure of the client image manager 150, and it may also implement the functions by using various other structures or in the way of software, firmware, or the like.

Sometimes, customers may make specific changes or configurations to their application servers, and they expect that the changes or configurations can be used in future provisioning. For this purpose, the provisioning service center may also contain a client generating apparatus which is similar to the disk image generating apparatus 100 of the image management and distribution center and is used to create incremental disk images and image profiles for new application images and store them in the client image repository. In this way, the provisioning service center stores and maintains a local image repository as the image management and distribution center does, and the difference is the size of the repository.

Figure 5:
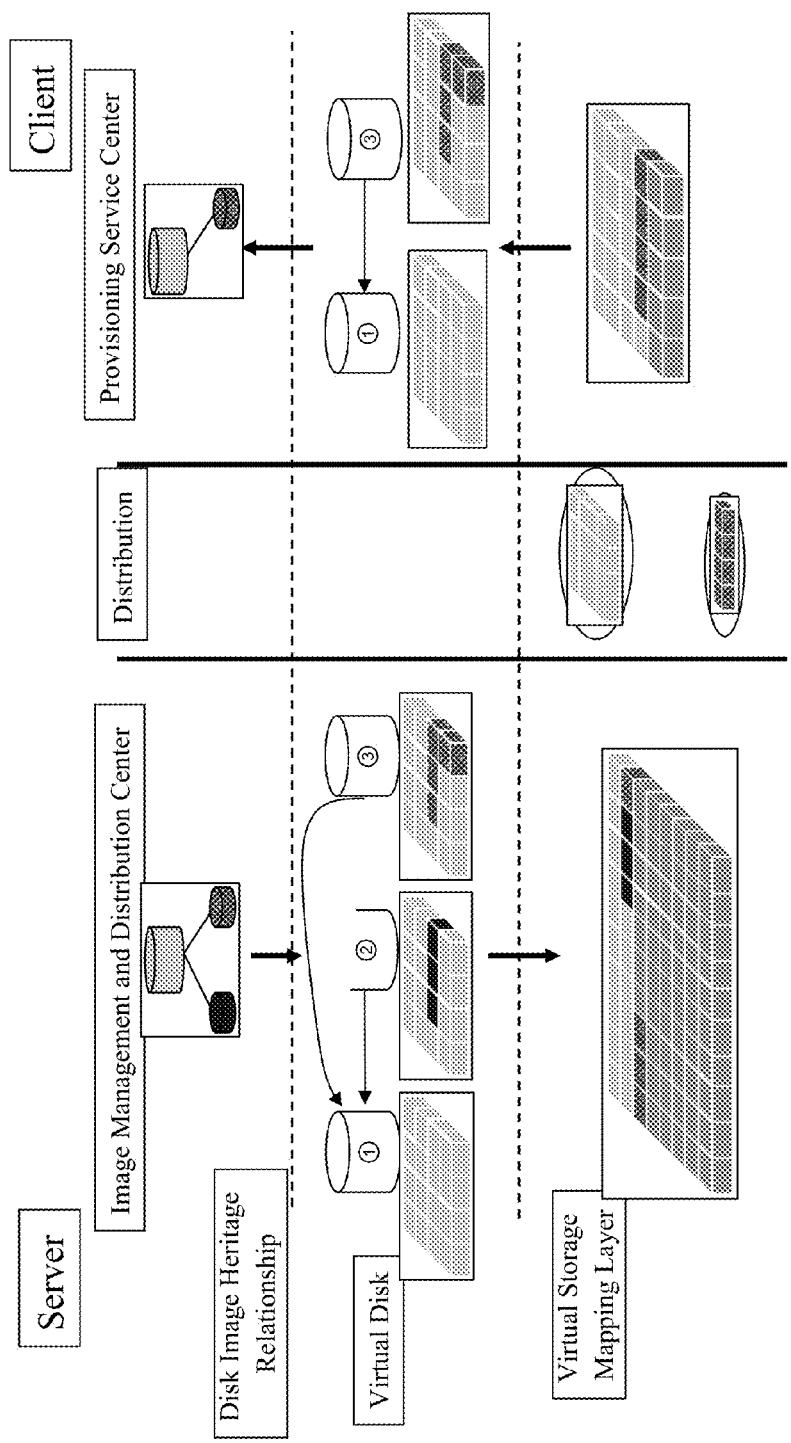
FIG. 5 shows an example of implementing the disk image generating and distribution and provisioning an application server using the disk images in an IBM San Volume Controller (SVC) system according to the embodiment of the invention.

FIG. 5 shows an example of implementing the disk image generating and distribution and provisioning the application server using the disk image in an IBM San Volume Controller (SVC) system according to the embodiment of the invention.

As is shown in FIG. 5, in the disk image heritage relationship representation layer, disk images provided for various software programs are generated and maintained on the server end, and the respective disk images are stored in a tree topology; and on the client end, a local image repository is stored and maintained by the client image manager. Here, we introduce a console as a customer interface for accessing the image management and distribution center on the server. It will cooperate with the SVC console to process customers' commands in order to create new disk images to expand the tree topology.

In the virtual disk layer, virtual disks are created using incremental flash copy to maintain every disk image. The flash copy is a feature in current IBM SVC products. The flash copy makes a copy of a set of source virtual disks to a set of target virtual disks. After the copy operation occurs, the original contents of the target virtual disks are lost, and the target virtual disks have the contents that the source virtual disks have at a certain point in time. That is to say, although the copy operation actually takes finite time, the resulting data at the targets appears as if the copy was completed instantaneously. The flash copy is sometimes described as an instance of a Time-zero copy (T0) or point-in-time copy technology. Although the flash copy operation takes definite time, this time is several orders of magnitude less than the time which would be required to copy the data using conventional technologies. The incremental flash copy means that only the different data blocks between the source virtual disks and the target virtual disks needed to have allocated new storage blocks for storing purpose. Those common data blocks will share the storage blocks in managed disks of SVC. With the incremental flash copy, two virtual disks may share a lot of common data blocks.

In the virtual storage mapping layer, a conversion from the virtual disks to the managed storage disks is performed, which maps the data blocks in the virtual disks with low-layer storage blocks in the managed disks.

Figure 6:
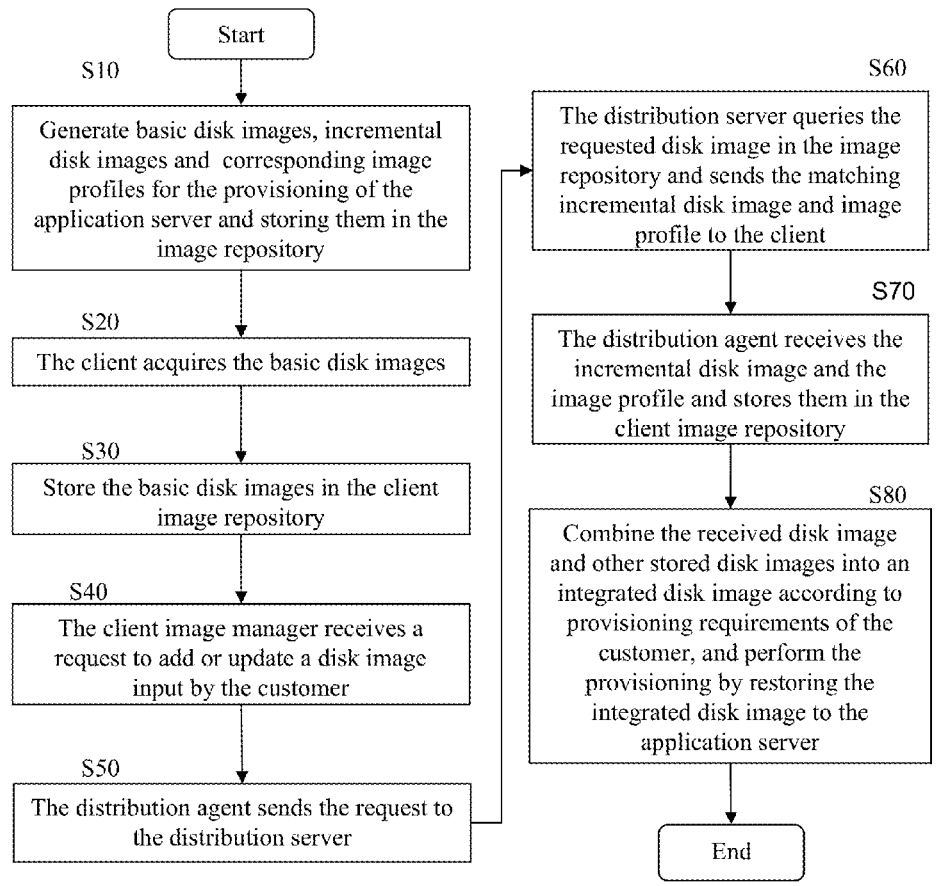
FIG. 6 is a flow chart depicting providing a disk image from a management and distribution center to a provisioning service center and provisioning a client application server according to an embodiment of the invention.

FIG. 6 is a flow chart describing providing the disk images from the management and distribution center to the provisioning service center and provisioning the application server of the client. This processing procedure will be described below in conjunction with FIG. 6.

First, in step S10, the disk image generating apparatus 100 generates basic disk images, incremental disk images and corresponding image profiles for the provisioning of the application server and storing them in the image repository. Hereinafter, a detailed implementation of this generating process is described by way of an example. Assume that the management and distribution center has generated a disk image of Windows 2000 on an IBM Blade Server, and a disk image is needed to be created for a DB2 8.1 server on Windows 2000 based on the IBM Blade Server. The system will initialize the incremental flash copy by triggering the SVC, so as to make a new flash copied virtual disk for the virtual disk maintaining the Windows 2000 disk image. Manually, the engineer installs DB2 8.1 on the Windows 2000 server. During the installation, some data blocks on the virtual disk will be modified, and the virtual storage mapping layer will generate new storage blocks for the data. As for unmodified data blocks, the virtual disk will use the storage blocks of the virtual disk that it inherits as shared data blocks. After the DB2 8.1 is installed, the system will change the tree topology in the image repository to add a new node to represent the just generated disk image.

Then, in step S20, the client acquires the basic disk images from the management and distribution center. The basic disk images may be distributed all over the world via a network or portable storage devices, such as optical disks. Additionally, the image profiles are also distributed together with the basic disk images. In step S30, the client provisioning service center gets these basic disk images and then stores them in the client image repository. The provisioning service center may simply use this disk image for provisioning, or it may restore the tree topology by the client image manager according to the image profile, and build its own disk image tree based on the tree topology. By the way, the user may view the disk image profile data on the provisioning service center directly to learn the contents of the corresponding disk image.

In step S40, when the customer needs a disk image for a new application, such as the DB2 8.1 on Windows 2000, the client image manager 150 receives parameters required for provisioning the application server input by the customer, such as the machine type, the OS type, and the required applications (here, the requirements are an IBM Blade Server, Windows 2000 and DB2 8.1). In step S50, the client image manager 150 calls the distribution agent 170 to send a request to the distribution server 120. In step S60, after obtaining the request, the distribution server 120 queries the requested disk image in the image repository and sends the matching incremental disk image and image profile to the client. Both the client's request and the image data distributed by the distribution server may be transmitted via the Internet to speed the updating of the client.

In step S70, the distribution agent 170 receives the incremental disk image and the image profile and stores them in the client image repository. In step S80, the client image manager 150 combines the received incremental image and other stored disk images into an integrated disk image according to the provisioning requirements of the customer, and provisions the application server by restoring (copying) this integrated disk image to the application server. Additionally, the client image manager 150 also expands the tree topology in the client image repository according to the received incremental image.

Optionally, before calling the distribution agent 170 to send the request, the client image manager 150 may search the client image repository to determine whether there are a matching image profile and a disk image (this querying operation is similar to that performed by the distribution server 120 in S60, details omitted), and restores the searched incremental disk image directly to the application server for provisioning. In a few minutes, by creating a virtual disk maintaining the incremental disk image and mapping it with the application server, the provisioning of the DB2 application server is realized. If the needed disk image is not found in the client image repository, the client image manager 150 calls the distribution agent 170 to acquire this disk image from the management and distribution center.

Figure 7:
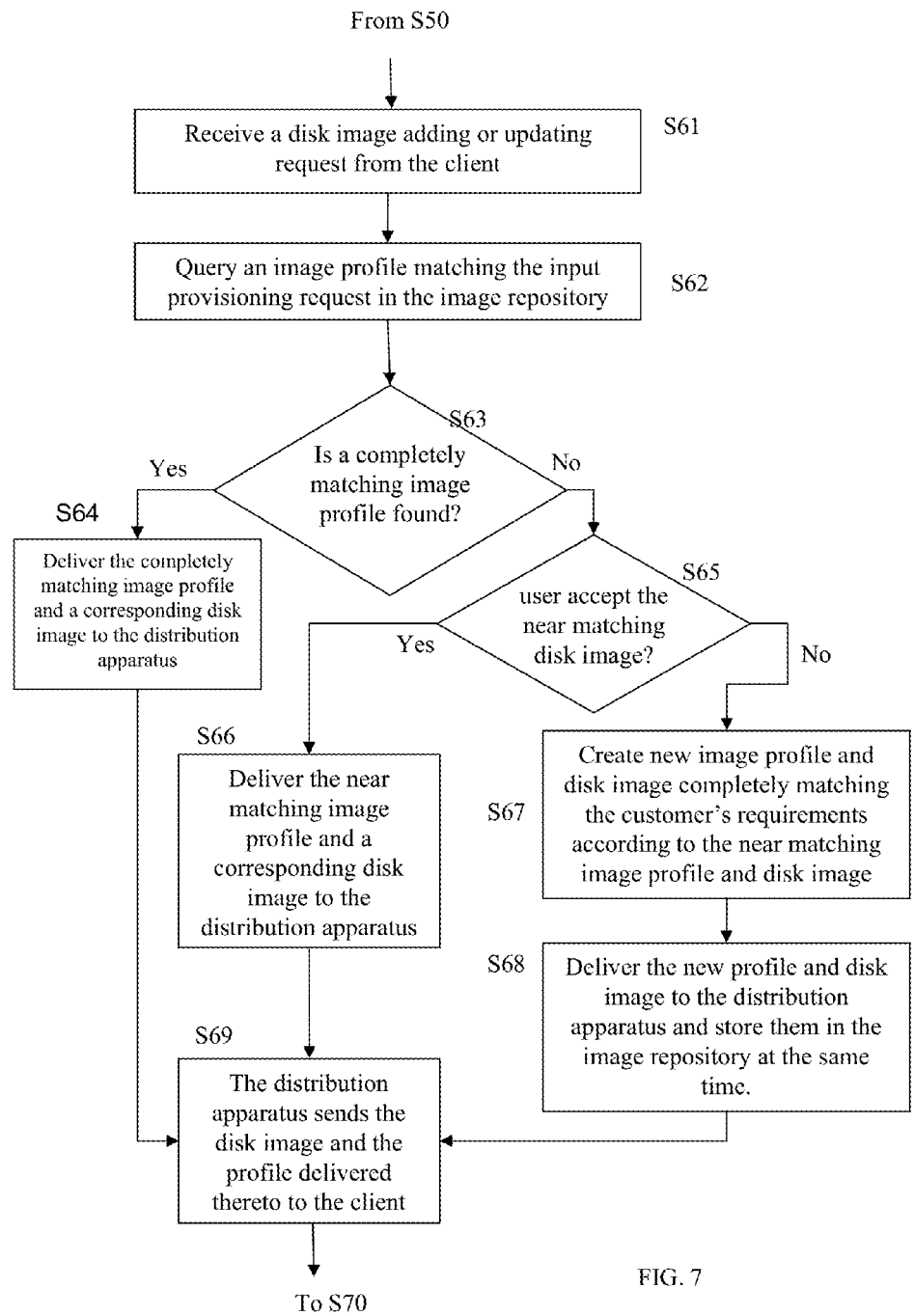
FIG. 7 is a flow chart depicting in detail querying a matching disk image in the management and distribution center according to the embodiment of the invention.

FIG. 7 depicts the querying operation performed in step S60 in FIG. 6 in detail. The querying operation will be explained below in detail with reference to FIG. 7. In step S61, the receiving apparatus 121 receives the request to add or update a disk image from the client. The request describes the requirements of hardware, software and configuration of the provisioning of the application server using XML or other data description languages, such as SGML and HTML, or a set of self-defined data description language. Then, in step S62, the querying apparatus 122 takes the received provisioning requirements as a query condition, and queries image profiles matching the input provisioning requirements in the image repository by a well-known query language, such as the SQL language or the like. In step S63, the querying apparatus 122 judges whether a completely matching image profile is found. If an image profile completely matching the query condition is found, the image profile and its corresponding disk image are delivered to the distribution apparatus 123 in step S64. If there is no completely matching image profile but only a near matching profile is found, the method turns to step S65. In step S65, the querying apparatus 122 determines whether the customer accepts the near matching disk image. When the customer accepts the near matching disk image, the method turns to step S66 and delivers directly the found near matching image profile and the corresponding disk image to the distribution apparatus 123; and if the customer does not accept it, the method turns to step S67 and calls the disk image generating apparatus 100 to create a new image profile and disk image completely matching the request of the customer according to the near matching image profile and disk image. Subsequently, in step S68, the new profile and disk image are delivered to the distribution apparatus 123 and will also be stored in the image repository at the same time. In step S69, the distribution apparatus 123 sends the disk image and image profile delivered thereto to the client via the Internet. Alternatively, the disk image and image profile obtained by querying may be copied to a storage medium, such as an optical disk, and provided to the client, instead of being sent via a network.

The method according to the embodiment of the invention may be embodied as computer readable codes/instructions/programs, and may be implemented in a general-purpose digital computer executing the codes/instructions/programs using, for example, a computer readable recording medium. Examples of the computer readable recording medium include a magnetic storage medium (e.g. ROM (Read Only Memory), floppy disk, hard disk, or the like), an optical storage medium (e.g. CD-ROM (Compact Disk-Read Only Memory) or DVD (Digital Versatile Disk)), and a storage medium like carrier (e.g. transmitted via the Internet). And, the method according to the embodiment of the invention may be embodied as a medium containing the computer readable codes, therefore, the computer readable recording medium is distributed over a network-coupled computer system and executed in a distributed manner. In addition, those programmers skilled in the art to which the invention pertains may easily construct the function programs, codes and code segments performing the method according to the embodiment of the invention.

Although some exemplary embodiments of the invention have been shown and described, those skilled in the art will understand that changes may be made to these exemplary embodiments without departing from the principle and spirit of the invention as defined in the appended claims and their equivalents.

What is claimed is:

1. An application server disk image generating apparatus for providing customized application content to any of a plurality of application servers having different application versions, comprising:
   a basic disk image generating means for generating and storing basic disk images for basic programs used by the server;
   an incremental disk image generating means for generating a plurality of different incremental disk images comprising one incremental disk image for each application having a heritage relationship with a basic program, wherein new disk images generated for each application are compared to stored basic disk images, the basic disk images are not repeated in the incremental disk images, and the incremental disk images comprise any disk image parts that were not found in the basic disk images and an image profile describing the heritage relationships for parts which are shared with the stored basic disk image; and an image profile generating means for generating an image profile for each of the basic disk images and the incremental disk images; and a distribution server for distributing disk images and corresponding image profiles to the client in response to at least one of a request to add or update the disk image received from a client already having said basic disk images and an automatic addition or update according to pre-settings of a customer, wherein the distribution server further comprises:

a receiving apparatus for receiving the request to add or update the disk image from the client;

a querying apparatus for querying an image profile matching the image profile of the requested disk image in the image repository, and a distribution apparatus for distributing the image profile output by said querying apparatus and the corresponding disk image to the client via the Internet, thereby providing customized application content to one of a plurality of application servers having different application versions.

2. The disk image generating apparatus of claim 1, wherein said image profile is used to describe requirements of hardware, software and configuration of provisioning the disk image, and to describe the heritage relationships between a corresponding disk image and other disk images.

3. The disk image generating apparatus of claim 1, wherein the basic disk image generating means and the incremental disk image generating means create virtual disks by means of incremental flash copy to save each of the disk images.

4. The disk image generating apparatus of claim 1 wherein said image profile uses one of XML, SGML, HTML, and a self-defined data description language for description.

5. An application server disk image management and distribution system for providing customized application content to any of a plurality of application servers having different application versions, comprising:

a basic disk image generating means for generating and storing basic disk images for basic programs used by the server;

an incremental disk image generating means for generating a plurality of different incremental disk images comprising one incremental disk image for each application having a heritage relationship with a basic program, wherein new disk images generated for each application are compared to stored basic disk images, the basic disk images are not repeated in the incremental disk images, and incremental disk images comprise any disk image parts that were not found in the basic disk images and an image profile describing the heritage relationships for parts which are shared with the stored basic disk image;

an image profile generating means for generating an image profile for each of the basic disk images and the incremental disk images;

an image repository for storing the generated disk images and image profiles; and a distribution server for distributing disk images and corresponding image profiles to the client in response to at least one of a request to add or update the disk image received from a client already having said basic disk images and an automatic addition or update according to pre-settings of a customer, wherein the distribution server further comprises:

a receiving apparatus for receiving the request to add or update the disk image from the client;

a querying apparatus for querying an image profile matching the image profile of the requested disk image in the image repository, and a distribution apparatus for distributing the image profile output by said querying apparatus and the corresponding disk image to the client via the Internet, thereby providing customized application content to any one of a plurality of application servers having different application versions.

6. The image management and distribution system of claim 5, wherein said image profile is used to describe requirements of hardware, software and configuration of provisioning the disk image, and describe a heritage relationship between a corresponding disk image and other disk images.

7. The image management and distribution system of claim 5, wherein said querying apparatus sends the corresponding disk image and completely matching image profile to the distribution apparatus directly if the image profile is found, and performs any one of the following processes according to the client's requirements if the completely matching image profile is not found:

sending the near matching image profile and its corresponding disk image to the distribution apparatus; or generating an image profile and a disk image completely matching the client's requirements by the incremental disk image generating means and the image profile generating means based on the disk image corresponding to the near matching image profile, and delivering the newly generated disk image and its image profile to the distribution apparatus.

8. The image management and distribution system of claim 5, wherein the basic image generating means and the incremental disk image generating means create virtual disks by way of incremental flash copy to save each of the disk images.

9. The image management and distribution system of claim 5, wherein said image profile uses one of XML, SGML, HTML, and a self-defined data description language for description.

10. The image management and distribution system of claim 5, further comprising a feedback information processing apparatus for, when receiving modification information of the provisioning of the server fed back from the client, generating an image profile and a disk image corresponding to said modification by the image profile generating means and the incremental disk image generating means and storing them in the image repository.

11. A system for provisioning an application server using disk images for providing customized application content to any of a plurality of application servers having different application versions, comprising:

a basic disk image manager for storing basic disk images for basic programs and corresponding image profiles in a client image repository, an incremental disk image manager for receiving and processing a request to add or update a disk image from a customer, wherein said incremental disk manager creates and stores a plurality of different incremental disk images comprising one incremental disk image for each application having a heritage relationship with a basic program, wherein new disk images generated for each application are compared to stored basic disk images, the basic disk images are not repeated in the incremental disk images and the incremental disk images comprise any disk image parts that were not found in the basic disk images and an image profile describing the heritage relationships for parts which are shared with the stored basic disk image;

a client image repository for storing disk images and image profiles, a distribution agent for, under the control of the incremental disk image manager, transferring the requests to add or update the disk image from the customer to a disk image management and distribution system and receiving the requested disk images and image profiles provided by the disk image management and distribution system, as well as receiving the disk images and the image profiles sent actively by the disk image management and distribution system according to pre-settings of the customer, and a provisioning means for restoring the disk image to the application server of the customer for provisioning, thereby providing customized application content to one of a plurality of application servers having different application versions.

12. The provisioning system of claim 11, wherein the provisioning means combines the received disk images and other disk images already stored in the client image repository into an integrated disk image according to provisioning requirements of the customer, and performs the provisioning by copying the integrated disk image to the application server of the customer.

13. An application server disk image generating method for providing customized application content to any of a plurality of application servers having different application versions, comprising:

generating and storing basic disk images for basic programs used by the server, generating a plurality of different incremental disk images comprising one incremental disk image for each application having a heritage relationship with a basic program, wherein new disk images generated for each application are compared to stored basic disk images, the basic disk images are not repeated in the incremental disk images and the incremental disk images comprise any disk image parts that were not found in the basic disk images and an image profile describing the heritage relationships for parts which are shared with the stored basic disk image, and generating an image profile for each disk image of the basic disk images and the incremental disk images;

receiving a request to add or update the disk image from the client;

querying an image profile matching the image profile of the requested disk image in the image repository, and distributing the image profile output by said querying apparatus and the corresponding disk image to the client via the Internet in response to at least one of a request to add or update the disk image received from a client already having said basic disk images and an automatic addition or update according to pre-settings of a customer, thereby providing customized application content to one of a plurality of application servers having different application versions.

14. The disk image generating method of claim 13, wherein said image profile is used to describe requirements of hardware, software and configuration of provisioning the disk image, and describe the heritage relationships between a corresponding disk image and other disk images.

15. The disk image generating method of claim 13, wherein virtual disks are created by way of incremental flash copy to save each of the disk images.

16. The disk image generating method of claim 13, wherein said image profile uses one of XML, SGML, HTML, and a self-defined data description language for description.

* * * * *